H. DEHL.
STONE CUTTING CHISEL.
APPLICATION FILED NOV. 1, 1910.

1,063,018.

Patented May 27, 1913.

Witnesses:

Inventor:
Heinrich Dehl.

UNITED STATES PATENT OFFICE.

HEINRICH DEHL, OF COLOGNE-LINDENTHAL, GERMANY, ASSIGNOR TO BERGISCH MÄRKISCHE STEININDUSTRIE, AKTIENGESELLSCHAFT, OF COLOGNE-ON-THE-RHINE, GERMANY.

STONE-CUTTING CHISEL.

1,063,018.  Specification of Letters Patent.  Patented May 27, 1913.

Application filed November 1, 1910. Serial No. 590,181.

*To all whom it may concern:*

Be it known that I, HEINRICH DEHL, engineer, residing at 120 Gleuelerstrasse, Cologne-Lindenthal, Kingdom of Prussia, Germany, have invented certain new and useful Improvements in Stone-Cutting Chisels, of which the following is a specification.

For cutting wedge holes in rocks and the like chisel-like tools are employed, which, having a wedge shape, are provided with cutting burs arranged either transversely or longitudinally and bordered on both sides with grooves, or with a beveled serrated edge. Whereas the chisels provided with transverse burs offer a considerable resistance to the feed in consequence of the large working and frictional surfaces simultaneously attacking on all sides, and will, particularly at the commencement of the cutting operation cause the portions of the rock around the hole to be crumbled off, or even lead to the lower, weaker projecting burs of the tool being damaged or broken off, the disadvantage of the longitudinally burred wedge chisels consists in the fact that a considerable superficial friction between the rock and the sides of the tool between the cutting edges is produced after the tool has been driven a good piece into the rock. These disadvantages of both types of tools may be avoided by providing, according to the present invention both the sides and the face ends of the chisel with a plurality of pyramid shaped projections or cutting points so that the surface of the chisel assumes a checkered or granulated appearance.

In the accompanying drawing two types of chisels according to the present invention are exemplified.

Figure 1:
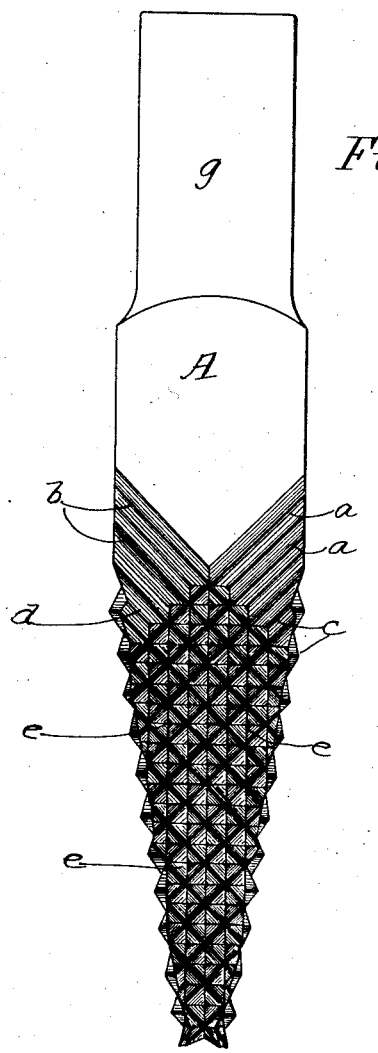
Figure 2:
Figure 3:

Figures 1 and 2 are a side and end view respectively of a piece of a chisel with the cutting projections arranged in parallel rows crossing each other at right angles. Fig. 3 is a side view of a piece of a chisel with the cutting projections arranged in parallel rows but alternately to each other.

The chisel A shown at Figs. 1 and 2 has for its working part the shape of a wedge and is provided on its two parallel sides as well as on its two inclined opposite sides with two series of parallel grooves $a$ and $b$, which are inclined to its longitudinal central axis in opposite directions, the grooves $a$ $a$ crossing the other ones $b$ $b$ at right angles. As all the grooves $a$ $b$ are of a V-cross section and leave sharp edges $c$ $c$ and $d$ $d$ between them, it follows, that on the part of the chisel covered with crossing grooves numerous pyramidal projections $e$ $e$ with sharp points are formed. The sharp points of these pyramidal projections $e$ $e$ are surrounded on all sides by gaps and will each individually attack only a small portion of the rock, each point cutting independently, and will therefore meet with a small resistance only, so that at the commencement, during the course and up to the end of the cutting operation no considerable increase of the difficulties will be observed, and the work will be performed in a smooth and rapid manner. The spaces between the several points facilitate the removal of the rock dust produced in cutting.

Where so preferred, the pyramidal projections $f$ $f$ on the wedge-chisel may be arranged in parallel rows and made to alternate with the projections in the neighboring rows, as is clearly shown at Fig. 3.

The wedge-chisel may be made of any suitable shape and size and may be arranged to be fitted with its shank $g$ into any power-driven cutting apparatus, provided with a suitable chuck.

I claim:

1. A wedge shaped chisel for cutting tapered holes in rocks, provided on all sides with a plurality of sharply pointed pyramidal projections.

2. A wedge shaped chisel for cutting tapered holes in rocks, provided on all sides with a plurality of sharply pointed pyramidal projections; said projections alternating in the longitudinal direction of the tool.

3. A wedge shaped chisel for cutting tapered holes in rocks, said chisel having a plurality of pyramid shaped projections terminating in cutting points and arranged in staggered relation throughout the cutting area of the tool; said projections arranged in parallel rows in two directions forming diagonal grooves between them, said grooves constituting channels for the removal of the material chipped by the cutting edges.

4. A wedge shaped chisel for cutting tapered holes in rocks, said chisel having a plurality of pyramid shaped projections arranged along its working surfaces; said projections forming a series of cutting edges along the sides of the chisel, each following projection extending farther out from the longitudinal axis of the wedge than its preceding neighbor, whereby each projection forms an individual cutting tool.

In testimony whereof I hereto affix my signature in presence of two witnesses.

HEINRICH DEHL.

In presence of—
 LOUIS VANDORY,
 BESSIE L. DUNLAP.

---

Copies of this patent may be obtained for five cents each, by addressing the "Commissioner of Patents, Washington, D. C."